Patented July 29, 1941

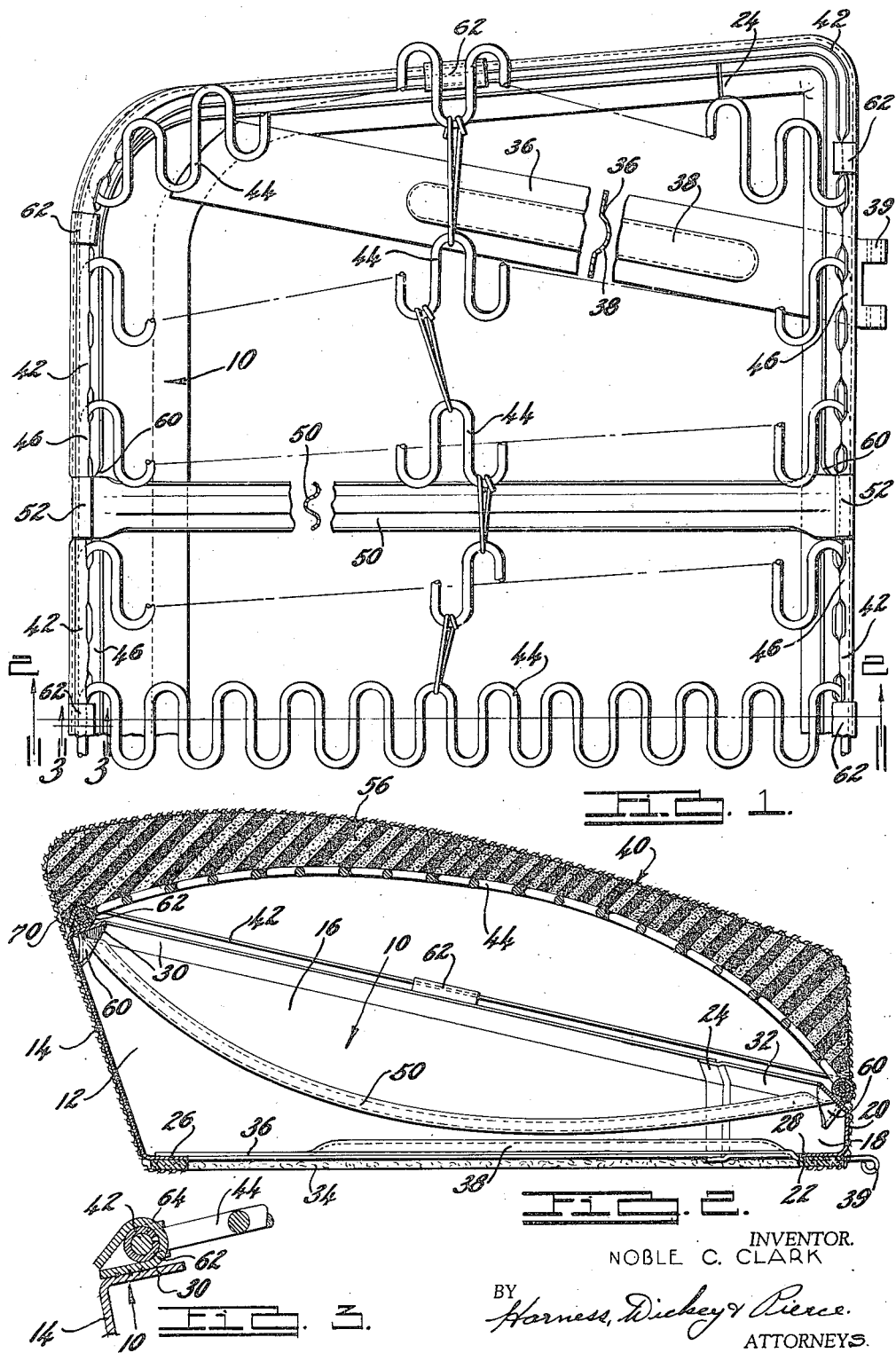

2,251,036

UNITED STATES PATENT OFFICE 2,251,036

SEAT CONSTRUCTION

Noble C. Clark, Pleasant Ridge, Mich., assignor to The Murray Corporation of America, Detroit, Mich., a corporation of Delaware Application May 23, 1938, Serial No. 209,427

7 Claims. (Cl. 155—179)

The present invention relates to seat constructions of the type particularly adapted for automobiles.

The present invention is particularly adapted for use in seat cushion constructions in which the spring load supporting surface is formed of a plurality of specially formed sinuous spring elements extending substantially parallel to each other in a curved plane defining the load surface and secured at their ends to a border frame.

One of the primary objects of the present invention is to provide an improved and simplified base frame so constructed that a spring construction may be readily attached thereto to thereby provide an improved seat cushion construction.

Another object of the invention is to provide an improved and simplified base frame which is light in weight and economical to manufacture.

Another object of the invention is to provide an improved seat construction having a relatively deep front edge in combination with a rubber covered spring surface, thereby providing a soft front edge in an improved manner.

Another object of the invention is to provide an improved base frame of such a construction that a spring load supporting means, which is adapted for use as a back or seat, may be readily positioned on and attached to the base frame to thereby provide an improved seat cushion construction.

Other objects of the invention will become apparent from the following specification, the drawing relating thereto, and from the claims hereinafter set forth.

In the drawing, in which like numerals are used to designate like parts of the several views throughout:

Figure 1 is a fragmentary top plan view of a seat cushion construction embodying features of the present invention;

Fig. 2 is a cross-sectional view taken substantially along the line 2—2 of Fig. 1; and Fig. 3 is an enlarged fragmentary cross-sectional view taken substantially along the line 3—3 of Fig. 1.

Referring to the drawing, a seat cushion construction is illustrated which comprises a generally rectangular base frame member generally indicated at 10. The base frame member 10 is formed of a generally U-shaped, sheet metal member 12 forming the front 14, and substantial portions of the sides 16 of the base frame. Another U-shaped, sheet metal member 18 forms the rear 20 and portions of the sides 22 of the base frame; and the forward edges of the sides 22 are inset as indicated at 24 where they overlap and are joined to the rear edges of the sides 16 of the U-shaped member 12. The U-shaped members 12 and 18 may be welded together along their lines of juncture so that a substantially rigid box-shaped base frame is provided. The members 12 and 18 are flanged inwardly as indicated at 26 and 28, respectively, along the lower edges thereof to further stiffen the frame. The upper edges of the members 12 and 18 are also sloped upwardly and inwardly at 30 and 32, respectively, so that an inwardly and upwardly sloping supporting edge is provided completely around the base frame for a particular purpose which will become more apparent from the following detailed description.

The base frame 10 may be also supported upon a wooden frame member 34 having front, side and rear edges which is of generally a shape corresponding to the shape of the base frame adjacent the lower edge thereof, so that the flanges 26 and 28 may be suitably attached to the frame 34.

For the purpose of bracing the base frame, transversely extending bracing members 36 of metal are provided which preferably extend across the rear corners of the base frame between the front and rear edges thereof and which may be suitably secured to the flanges 26 and 28 as by welding or the like. The bracing members 36 may be stamped to provide longitudinally extending offset portions 38 which serve to stiffen the bracing members. Also the bracing members 36 may extend rearwardly beyond the rear edge of the base frame as indicated at 39 and provide means whereby the base frame may be attached to the vehicle floor.

The base frame 10, as above constructed, is preferably deeper adjacent the front than the rear thereof so that the seat cushion construction is deeper at the front than the rear in accordance with the usual practice.

The base frame 10 is adapted to have supported thereon and attached thereto a spring load supporting construction generally indicated at 40. The spring cushion construction 40 is generally of the character and construction as disclosed and claimed in the co-pending application of Clarence H. Menge, Serial No. 139,765, filed April 29, 1937. The spring construction 40 is generally of the same shape as the shape of the base frame adjacent the upper edge thereof and has a border frame 42 which is formed of a sheet metal member of channel shape.

The surface of the spring construction 40 is composed of a plurality of arcuately disposed, continuously bent spring elements 44 of the general type disclosed in the Kaden Patent No. 2,000,399. As disclosed in this patent, the spring elements 44 are preferably formed of wire bent to provide a series of similar adjacent lateral convolutions all lying in substantially the same arcuate surface. After the spring wire has been bent to the predetermined desired form, the spring elements are normalized in order that they will have an inherent tendency to lie along arcs of substantially smaller radii than the arcs upon which they are disposed when utilized in the construction of the seat cushion.

These spring elements 44 are cut to suitable desired length and are severed at such a point that they provide a last lateral convolution extending substantially transversely of the length of the spring elements, which last lateral convolution is utilized to anchor the ends of the spring elements in position in the front and rear edges of the border frame 42.

As disclosed in the Menge application above referred to, the border frame element 42 is formed of sheet metal of rolled section which may conveniently be formed in continuous lengths. These border frame elements are generally of channel section with the walls of the channel crimped together at spaced points 46 along the front and rear edges of the border frame, thus providing channels which are adapted to receive and anchor the last lateral convolutions of the spring elements 44 in position within the channels.

Since the spring elements making up the surface structure of the cushion construction are all tensioned to lie along arcs of substantially smaller radius than that on which they are disposed when mounted in the cushion construction, there is an inherent tendency to draw the front and rear edges of the border frame together. Consequently, in order to brace the border frame 42 against this, it has been found necessary and desirable to provide suitable transverse bracing elements 50. The elements 50 are preferably transversely curved longitudinally thereof so as to stiffen the bracing element; and the ends 52 are bent over the forward and rear edges of the border frame 42. The bent over portions 52 may be welded, or otherwise suitably secured, to the border frame element. The bracing elements 50 are preferably arcuately disposed on an arc directed away from the arc of the elements 44 in order not to interfere with the function of the arcuately disposed sinuous spring elements 38.

A resilient padding member 56 which is preferably of sponge rubber is disposed on the spring surface formed by the spring elements 44 so that a soft cushion is provided. Such a cushion provides a soft front edge when the spring construction is disposed on the base frame; and the sponge rubber member 56 may be disposed directly on the spring element 44.

The spring construction 40 above described may be used either as a back cushion or as a seat cushion, and in the present invention, the construction 40 is adapted to seat upon and be attached to the base frame 10. The border frame 42 is adapted to rest upon the inwardly and upwardly sloping flange portions 30 and 32 of the base frame completely around the base frame. By the upward and inward slope of the flanges 30 and 32 the base frame 42 is accurately seated and cannot be displaced by any sidewise movement of the cushion construction 40. In order to provide for reception of the downwardly arced bracing members 50, the flanges 30 and 32 are bent downwardly as indicated at 60 at points corresponding to the positions of the bracing members 50 on the border frame. The bent down portions 60 are substantially the same width as the width of the bracing members 50 so that the bent down portions provide recesses which serve to accurately position the spring construction on the base frame and also serve to prevent displacement of the spring construction relative to the base frame.

In order to attach the border frame 42 to the base frame 10 clips 62 are welded to the flanges 30 and 32 at spaced points around the base frame which when first applied to the base frame have upstanding portions 64. The upstanding portions 64 may then be bent over the border frame 42, as best shown in Fig. 3, so that the border frame 42 and consequently the spring construction 40 is held in place on the base frame. While in the illustrated embodiment the clips 62 are illustrated as being separate elements attached to the base frame 10, it is to be understood that such clips could be provided by striking out similar portions from the flanges 30 and 32. In this event it would be preferable to provide additional metal at these points so that the struck-out tabs would be of sufficient length to envelope the border frame 42.

A finished material 70 may be disposed over the cushion 56 and carried over the guides, front and rear of the base frame and tacked to the wooden frame member 34 in the usual way.

From the above it is evident that a simplified construction is provided which is particularly adapted for convenient assembly so that a spring construction which may be used for either seat backs or seats may be readily applied to a seat base frame. It is also evident that a simplified and improved base frame is provided which is rugged in construction and yet which is light in weight and economical to manufacture.

Formal changes may be made in the specific embodiment of the invention described without departing from the spirit and substance of the invention, the scope of which is commensurate with the appended claims.

What is claimed is:

1. A seat cushion construction comprising a base frame formed of a pair of U-shaped sheet metal members joined together to form a box section of greater depth adjacent the front than the rear thereof, a border frame element of a shape complementary to that of said base frame, elongated spring elements disposed between and fixed to opposite sides of said border frame forming a spring surface, and means attaching said border frame to said U-shaped members adjacent the upper edges thereof.

2. A seat cushion construction comprising a base frame formed of a pair of U-shaped sheet metal members joined together to form a box section of greater depth adjacent the front than the rear thereof, the upper edges of said U-shaped members being sloped upwardly and inwardly of said base frame to form a support, a border frame member of a shape complementary to the shape of said base frame, elongated spring elements disposed between and fixed to opposite sides of said border frame, said border frame being so shaped as to seat upon the upwardly and inwardly sloping portions of said base frame, and means attaching said border frame to said base frame.

3. A seat cushion construction comprising a base frame formed of a pair of U-shaped sheet metal members joined together to form a box section of greater depth adjacent the front than the rear thereof, the upper edges of said U-shaped members being sloped inwardly and upwardly of said base frame to form a support, a border frame member of a shape complementary to that of said base frame, elongated zigzag spring elements disposed between and fixed to opposite sides of said border frame member forming a spring surface, bracing means extending between said opposite sides of said border frame, said border frame being so shaped that it seats upon said inwardly and upwardly sloping portions of said base frame, and means for attaching said border frame to said base frame.

4. A seat cushion construction comprising a base frame formed of a pair of U-shaped sheet metal members joined together to form a box section of greater depth adjacent the front than the rear thereof, a border frame member of a shape complementary to that of said base frame, elongated spring elements disposed between and fixed to opposite sides of said border frame forming a spring surface, means attaching said border frame to said base frame around the upper edge thereof, and a rubber padding member of substantial depth disposed on said elongated spring elements providing a resilient cushion.

5. A seat cushion construction comprising a base frame formed of a pair of U-shaped sheet metal members joined together to form a box section of greater depth adjacent the front than the rear thereof, the upper edges of said U-shaped member being inwardly directed to form a supporting surface, a border frame member of a shape complementary to that of said base frame to which it is secured, elongated spring elements disposed between and fixed to opposite sides of said border frame member and set upon an upwardly directed bow forming a spring surface, downwardly bowed bracing members extending between said opposite sides of said border frame and fixed thereto, said border frame being so shaped that it seats upon said supporting surface and said surface being recessed adjacent said bracing members to receive said bracing members in said recesses to thereby prevent displacement of said border frame.

6. A seat cushion construction comprising a base frame formed of a pair of U-shaped sheet metal members joined together to form a box section of greater depth adjacent the front than the rear thereof, the upper edges of said U-shaped member being inwardly and upwardly sloped to form a supporting surface, a border frame member of a shape complementary to that of said base frame, means releasably securing said frame member to said base frame, elongated spring elements disposed between and fixed to opposite sides of said border frame member and set upon an upwardly directed bow forming a spring surface, downwardly bowed bracing members extending between said opposite sides of said border frame and fixed thereto, said border frame being so shaped that it seats upon said supporting surface and said surface being recessed adjacent said bracing members to receive said bracing members in said recesses to thereby prevent displacement of said border frame.

7. A seat cushion construction comprising a base frame formed of a pair of U-shaped sheet metal members joined together to form a box section of greater depth adjacent the front than the rear thereof, the upper edges of said U-shaped member being inwardly and upwardly sloped to form a supporting surface, a border frame member of a shape complementary to that of said base frame, elongated spring elements disposed between and fixed to opposite sides of said border frame member and set upon an upwardly directed bow forming a spring surface, downwardly bowed bracing members extending between said opposite sides of said border frame and fixed thereto, said border frame being so shaped that it seats upon said supporting surface, said surface being recessed adjacent said bracing members to receive said bracing members in said recesses to thereby prevent displacement of said border frame, and means attaching said border frame to said base frame.

NOBLE C. CLARK.